US006608393B2

(12) United States Patent
Anderson

(10) Patent No.: US 6,608,393 B2
(45) Date of Patent: Aug. 19, 2003

(54) PORTABLE DC POWER GENERATOR WITH CONSTANT VOLTAGE

(76) Inventor: Clifton Gerard Anderson, 11502 Fruitwood Dr., Houston, TX (US) 77089

(*) Notice: Subject to any disclaimer, the term of this patent is extended or adjusted under 35 U.S.C. 154(b) by 86 days.

(21) Appl. No.: 10/003,548

(22) Filed: Oct. 24, 2001

(65) Prior Publication Data

US 2002/0070554 A1 Jun. 13, 2002

Related U.S. Application Data

(63) Continuation-in-part of application No. 09/024,470, filed on Feb. 17, 1998, now abandoned, which is a continuation-in-part of application No. 08/808,178, filed on Feb. 28, 1997, now abandoned.

(51) Int. Cl.[7] .................. H02P 9/04

(52) U.S. Cl. .................. 290/1 A; 290/1 R; 322/1

(58) Field of Search .................. 290/1 R, 1 A, 290/1 B; 322/1

(56) References Cited

U.S. PATENT DOCUMENTS 4,595,841 A * 6/1986 Yaguchi .................. 290/1 A
4,647,835 A * 3/1987 Fujikawa et al. .................. 322/1
4,721,070 A * 1/1988 Tanaka et al. .................. 123/2
4,835,405 A * 5/1989 Clancey et al. .................. 290/1 A
4,907,546 A * 3/1990 Ishii et al. .................. 123/41.56
5,929,611 A * 7/1999 Scott et al. .................. 322/46
5,977,667 A * 11/1999 Hirose .................. 310/51
6,091,160 A * 7/2000 Kouchi et al. .................. 290/1 A
6,100,599 A * 8/2000 Kouchi et al. .................. 290/1 A
6,489,690 B1 * 12/2002 Hatsugai et al. .................. 290/1 A

* cited by examiner

*Primary Examiner*—Nicholas Ponomarenko
(74) *Attorney, Agent, or Firm*—Harrison Law Office

(57) ABSTRACT

An apparatus for generating a constant source of electrical power in remote locations in the field for use while camping or hunting, in vehicles, on water craft, or for providing power during emergencies due to power failures, accidents, storms, or natural catastrophies. A safely and efficiently operating power generator that makes a minimal intrusion upon the environment is provided comprising a low horsepower gasoline-powered engine which drives a permanent magnet 12-volt AC/DC generator having a built-in electronic governor circuit for sustaining a constant DC output. Constructed with a flexible coupling between the gasoline-powered engine and the generator, and a suitably sized resonator and inherent governor circuit, the invention affords a constant output and quiet operation for use in vehicles, on water craft, and in the field to provide electricity for illumination or for operating common 12-volt appliances.

7 Claims, 8 Drawing Sheets

PORTABLE DC POWER GENERATOR WITH CONSTANT VOLTAGE

RELATED APPLICATIONS

This application is a continuation-in-part of U.S. application Ser. No. 09/024,470 filed Feb. 17, 1998 now abandoned, which is a continuation-in-part of U.S. application Ser. No. 08/808,178 filed Feb. 28, 1997, now abandoned.

BACKGROUND OF THE INVENTION

This invention relates to power generation, and more particularly relates to a portable apparatus for providing power at remote locations in the field, in automobiles and other vehicles, on boats and other water craft, and the like.

As is well known by those skilled in the art, the activities of sportsman, fisherman and workers in the field are severely limited by the duration of daylight. A fisherman who discovers and enjoys an aquatic paradise must abandon such locations when darkness falls; indeed, for safety reasons, fishing activities should be terminated prior to the onset of darkness. Similarly, the activities of hunters are generally limited to daylight hours and such hunting activities should preferably be terminated prior to the sunset to avoid accidents and injuries. It will be appreciated by those conversant with the art that, if a portable source of power were available which caused no more than minimal impact upon the natural sportsmans' environment, then electricity could be used to provide illumination via suitably designed portable lighting assemblies.

Those skilled in the art are aware of mobile illumination structures that are used to enable highway construction to be conducted during non-peak times, typically at night or during early morning hours. The same or similar structures are also used to provide illumination for filming activities at night or during early morning hours. While affording commercial advantage to construction or filming crews, these elaborate and expensive structures are inapposite of the needs of the individual sportsman and the like. To be useful to sportsman, power and lighting accessories must be portable in the sense of being lightweight and compact. Furthermore, such sources of power and illumination must be inherently safe and should preferably operate quietly to sustain natural environmental conditions.

For example, Baker discloses in U.S. Pat. No. 4,376,250 a power source intended for operating power tools on construction job sites. This apparatus may be attached to an automobile or truck and transported to a particular job site. To avoid safety hazards associated with the use of combustible fuels to generate sufficient electricity to drive construction tools and the like, noiseless conventional automotive batteries are used. Transformers and sophisticated semiconductor circuits are needed to regulate the generated 115 volt AC power output. Similarly, in U.S. Pat. No. 5,272,609, Nelson teaches a mobile, cumbersome and heavy, apparatus for lighting a construction site and the like, comprising a metal cart with a heavy duty battery.

Another important need for such portable and safe power is to provide electricity during emergencies such as power failures, natural disasters, etc. While battery-operated appliances are well known in the art, ultimately the power stored in batteries is consumed and the batteries must be recharged or replaced. A portable source of power as contemplated under the present invention may be used to charge batteries and to power a diversity of appliances. For example, portable electrically powered refrigeration units and the like are designed for use in autos and boats from main power sources and under exigent circumstances. There are, of course, several other popular 12-volt appliances used in vehicles and boats. The availability of a convenient and portable power supply would enhance the utility of such portable appliances.

There have been several developments in the art to provide power and illumination to workers and sportsmen in the field. For example, in U.S. Pat. No. 5,555,852, Bowen discloses a portable AC power generator designed to be carried on a worker's back. The Bowen apparatus uses middle distillate fuels to drive the engine, but is too cumbersome and heavy to be routinely hand-held to be carried and safely operated on boats and other sporting environments.

As another example, Yokoyama, in U.S. Pat. No. 5,212,952, teaches a compact apparatus using a water-cooled 2-cycle gas-fueled engine to generate power. Steele teaches, in U.S. Pat. No. 4,870,811, a gasoline powered AC power supply for operating electrical lawn mowers and auxiliary electrical hand tools. In U.S. Pat. Nos. 4,751,629 and 4,918,592, Shimuzu discloses embodiments of a portable apparatus for regulating AC or DC power.

Notwithstanding these and related developments in the art, there appears to be no apparatus which provides sufficient portability and safety for use in the field even under frequently encountered water-wet conditions. Thus, it would be advantageous to have access to a simple, lightweight and safe apparatus which generates sufficient power to operate a diversity of 12 volt appliances and equipment, to provide illumination during periods of darkness, and to charge batteries in the field.

Accordingly, the limitations and disadvantages of the prior art are overcome with the present invention, and improved means and techniques are provided which are useful for making available remote power for common 12-volt appliances and the like, tools and equipment in the field during fishing, camping, and various other outdoor activities and during emergencies.

SUMMARY OF THE INVENTION

The present invention provides an apparatus for generating a constant source of DC electrical power in remote locations in the field for use in vehicles, while camping or hunting, while fishing or recreating on water craft, etc., or for providing power during emergencies due to power failures, accidents, storms, or natural catastrophes. As will be appreciated by those skilled in the art, the present invention inherently provides a safety and efficiently operating power generator that imposes a minimal intrusion upon the environment heretofore unknown in the art.

The preferred embodiment of the present invention comprises a low horsepower gasoline-powered engine which drives a permanent magnet 12-volt AC or DC generator having an electronic governor circuit for sustaining a constant DC output. As will be hereinafter described in detail, the present invention teaches a quiet, cool-running, low RPM portable generator that may be conveniently run for protracted periods of time because of its particularly efficient operation attributable to a disproportionately high hp input engine and a novel governor circuit. Constructed with a suitable muffler member and inherent electronic governor circuit, the present invention affords a constant output and quiet operation especially advantageous for use in the field for campers, hunters, fishermen, etc., by porting electricity for use by portable illuminating devices or for operating appliances and the like.

The present invention includes a compact circuit that regulates the voltage output by controlling the RPM of the generator. Without adding noticeable bulk or weight to the apparatus taught by the present invention, this governor circuit replaces a conventional mechanical governor and assures that electrical output is constant enough to operate a notebook computer and similarly sensitive electrically-operated devices. As will be appreciated by those skilled in the art, the present invention is constructed to prevent intrusion from moisture and the like that are common hazards in the field. Accordingly, it is an advantage and feature of the present invention that portable constant low-voltage DC electricity is provided by an unusually quiet and safe motor-generator combination.

The present invention also teaches a portable self-contained lighting assembly which may be integrated with the portable power supply which will be hereinafter described in detail. Preferably completely contained within a cylindrical enclosure, this lightweight illumination source may be conveniently assembled in the field and provide light during darkness and the like for protracted periods of time.

It is an object of the present invention to provide a portable lightweight and compact apparatus for generating low voltage DC power for use in vehicles, on water craft, and in the field during hunting, camping, and other recreational activities, or activities at commercial job sites.

It is another object of the present invention to provide an apparatus for generating low voltage DC power without adversely affecting the environment.

It is still another object of the present invention to provide a portable apparatus for generating constant low voltage DC power.

It is yet another object of the present invention to provide an apparatus for efficiently and quietly generating constant low voltage DC power.

It is still another object of the present invention to provide a portable apparatus for generating constant low voltage power applicable in vehicles, in water craft and the like.

It is still another object of the present invention to provide a portable apparatus for generating constant low voltage DC power applicable during camping, hunting, and other outdoor activities, or activities at commercial job sites.

It is a further object of the present invention to provide a portable apparatus for providing power during emergencies.

It is another object of the present invention to provide a portable apparatus for generating constant low voltage DC power for providing illumination to prolong the available times for enjoying camping, hunting, and other outdoor sporting activities.

It is still another object of the present invention to replace the conventional mechanical governor of a gasoline-engine with an electronic governor.

It is another object of the present invention to regulate the RPM of a gasoline-engine with an electronic governor through automatic loading and unloading of a DC generator by means of a Zener diode assembly.

It is still another object of the present invention to provide a portable low RPM generator for providing constant low voltage DC power and simultaneously operate at relatively cool temperatures with concomitant minimal noise and component wear.

These and other objects and features of the present invention will become apparent from the following detailed description, wherein reference is made to the figures in the accompanying drawings wherein like numerals refer to like components.

IN THE DRAWINGS

DETAILED DESCRIPTION

Figure 1:
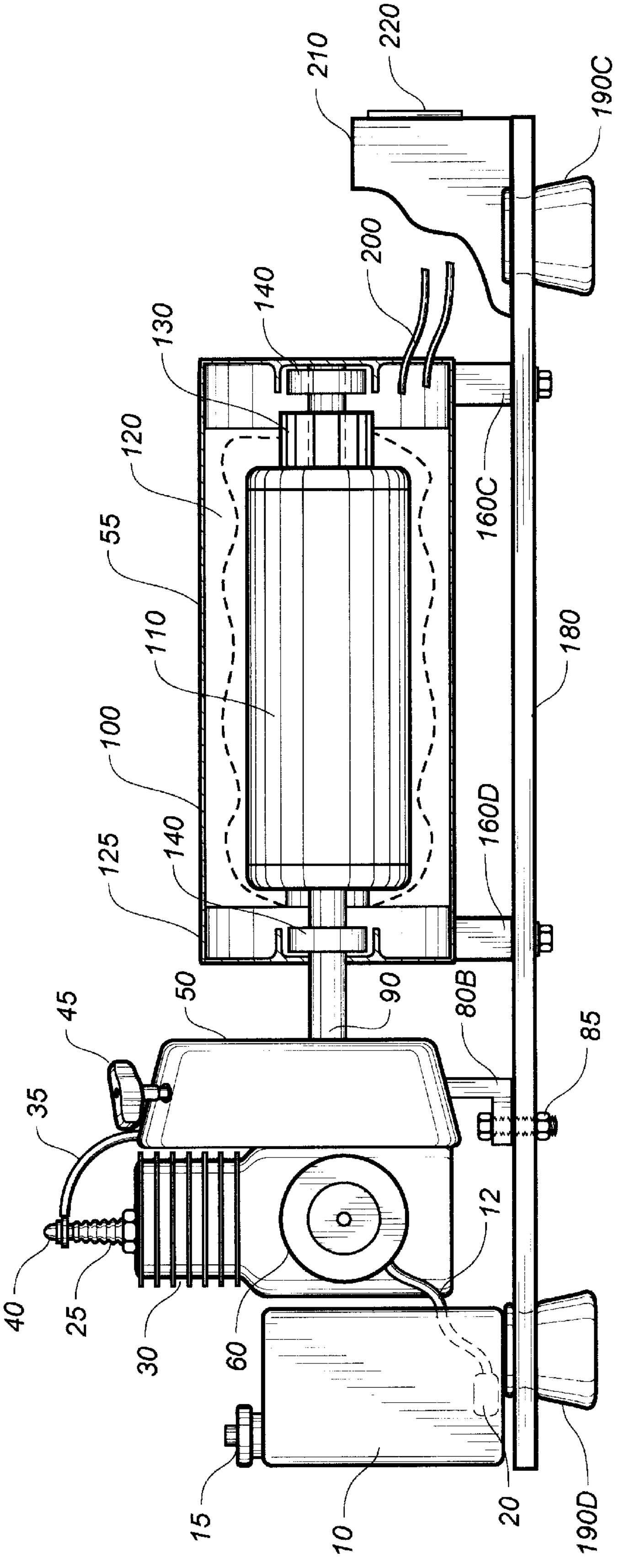
FIG. 1 depicts a frontal partial cut-away view of an embodiment of the present invention.
Figure 2:
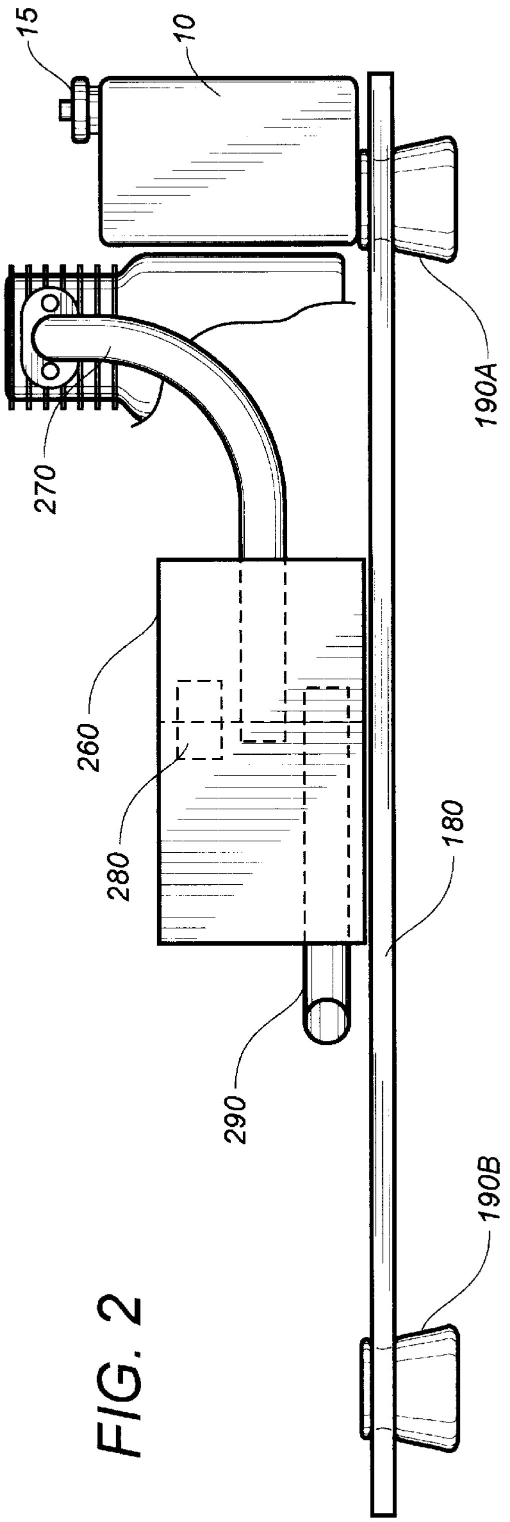
FIG. 2 depicts a rear view of a portion of the embodiment depicted in FIG. 1.
Figure 3:
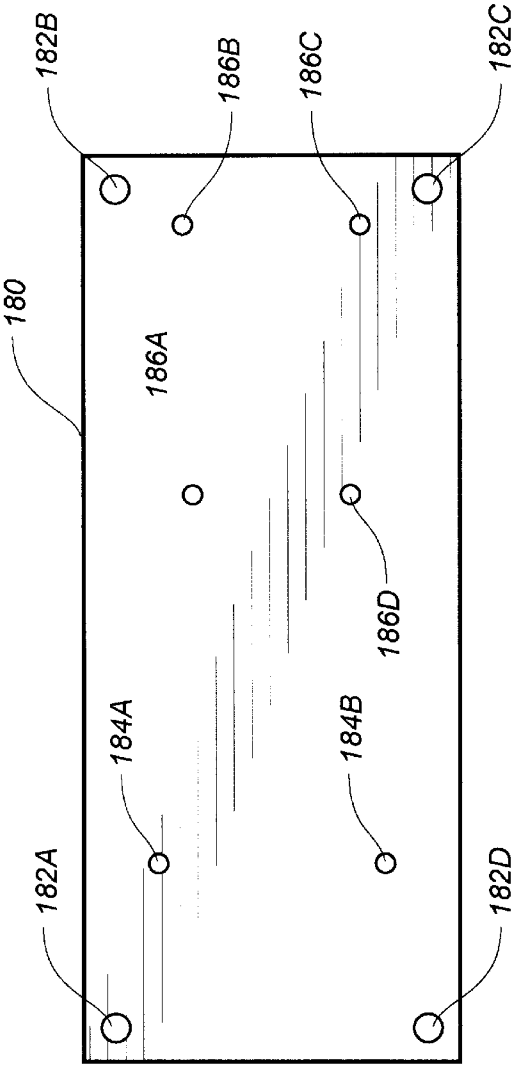
FIG. 3 depicts a planar top view of a portion of the embodiment depicted in FIG. 1.
Figure 4:
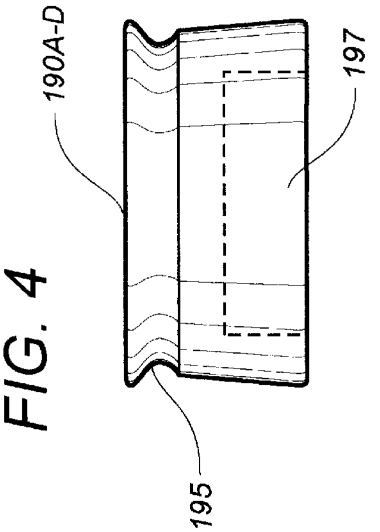
FIG. 4 depicts another frontal view of a portion of the embodiment depicted in FIG. 1.

Now referring collectively to FIGS. 1–12, there are seen embodiments of the present invention. Specifically referring to FIG. 1, there is seen a frontal view of the preferred embodiment of the present invention. Comprising portable power generator 2 are generator housing 100, liquid-fuel engine 25 and fuel tank 10 fixedly mounted upon base plate 180. Referring to FIGS. 3 and 4, as will be appreciated by those skilled in the art, base plate 180, preferably received abutably by rubber shock absorbers 190 C and D, should preferably be situated upon substantially horizontal ground in the field or on a flat portion of a boat bottom for security and safety purposes. Preferably concave groove 195 disposed in the top portion of shock absorber 190 is configured to retain base plate 180 therein. As will be appreciated by those skilled in the art, the liquid fuel used in the preferred embodiment is conventional gasoline. Of course, other liquid fuels applicable in internal combustion engines contemplated by the present invention such as diesel fuel may be used.

Referring to FIG. 1, gasoline engine 25 is fixedly attached to base plate 180 by pair of brackets 80 A and B. Also affixed to base plate 180 is fuel tank 10 which is fluidly interconnected with engine 25 through fuel line 12. Conventional gasoline cap 15 and fuel filter 20 assure the integrity of the gasoline fuel fed to engine 25 in a manner well known in the art. Engine 25 comprises spark plug 40 and spark plug wire 35 which function to ignite the gasoline flowing from fuel tank 10 to engine 25 through fuel line 12. Liquid fuel is thereby caused to ignite in a conventional manner in combustion chamber 30. The operation of gasoline engine 25 is initiated by pull-cord 45 in a manner well known in the art, and is similar to the pull-starts commonly performed to trigger the operation of lawn-mowers and outboard engines.

Figure 7:
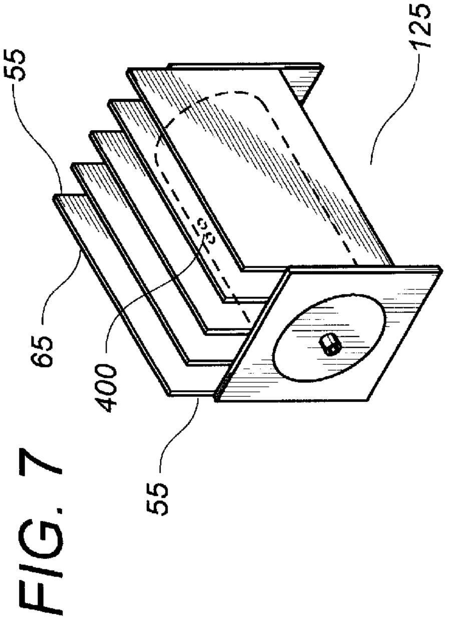
FIG. 7 depicts a simplified perspective side view of a fin member and generator assembly embodiment of the present invention.

Also depicted in FIGS. 1 and 7 are shroud 50 which encases conventional flywheel and cooling fin assembly 55 and the ignition system as hereinbefore described. Gasoline engine 25 is interconnected with generator 125 through crankshaft 90. Generator 125 is preferably a permanent magnet DC type motor. Encased ball bearings 140 to minimize friction on output shaft 90 connected from gasoline engine 25 to armature 110 which, in turn, rotates crankshaft 90. As will be appreciated by those skilled in the art, armature 110 is preferably constructed with a DC winding, whereby the DC current generated is harnessed in conventional commutator and brush assembly 130. Permanent magnet means is depicted by numeral 120. Output wires 200 deliver electricity generated from brushes and commutator assembly 130 to an electrical device such as the lighting assembly depicted in FIG. 12 ported thereto. The power generated by the present invention may be used to drive virtually any common 12-volt DC appliance and the like.

Referring now to FIGS. 1–7, there are depicted insulation 210 encasing and protecting circuit-breaker and fuse combination (not shown) and voltmeter 220. As shown specifically in FIG. 3, there is depicted a plan view of preferably aluminum base plate 180 comprising plurality of holes 182 A–D for mounting plurality of shock absorbers 190 A–D, plurality of holes 184 A–B for mounting engine 25 via engine brackets 80 A–B, and plurality of holes 186 A–D for mounting generator assembly 125 via bracket supports 160 A–D. Brackets 80 A–B and 160 A–D may be fixedly attached to base plate 180 with any suitable fastening means such as bolt 85.

FIG. 4 depicts shock absorber 190 contemplated by the present invention. Each of plurality of shock absorbers 190 A–D is received in a perpendicular orientation relative to the horizontal surface of base plate 180. Groove 195 disposed in the top portion of shock absorber 190 is configured to be abutably received by a corresponding aperture of plurality of apertures 182 A–D, whereupon shock absorbers 190 A–D contact the ground or boat surface or the like. It has been found that if shock absorber 190 is constructed with rubber having a hollow portion then additional flexibility is imparted thereto, whereby a diversity of surfaces and contours may be accommodated. Accordingly, shock absorber 190 is shown having axial cavity 197. As will be understood by practitioners in the art, the shock absorbers contemplated by the present invention may be bell-shaped to provide additional stability and to further isolate the apparatus taught by the present invention from vibration. It should also be understood that instead of embodying a base plate, the present invention may attach the shroud to the generator housing and the shock absorber may be mounted directly on the housing containing the gasoline engine and generator. It will also be appreciated that the generator may even be suspended using a spring or elastic strap disposed under an automobile hood or the like.

Referring again to FIGS. 1–6, there is shown exhaust system 260 incorporated into apparatus 2 of the present invention. In addition to providing the user protection from safety hazards associated with using gasoline-powered engines and the like in water-wet environments such as fishing, the present invention affords quiet operation by integrating a specially designed muffler system with the type of engine that will be herein described. In a manner well known in the internal combustion engine art, exhaust manifold 270 transports exhaust fumes from engine 25 through silencer or resonator 280 into muffler 260 and through tail pipe 290. Thus, the structure taught herein provides a portable power generating apparatus that operates significantly quieter than a conventional lawn mower, Weedeater, and the like.

Figure 6:
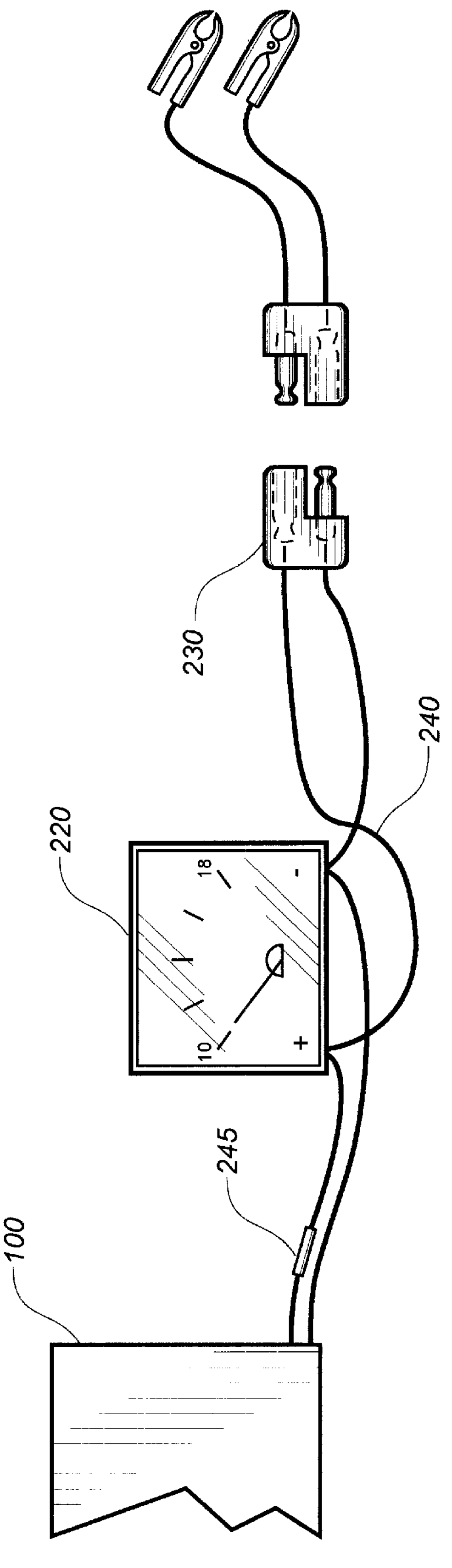
FIG. 6 depicts a simplified right side view of an optional voltmeter embodiment of the present invention.

Referring now to FIG. 6, there is depicted voltmeter 220 electrically connected in parallel to the power output of DC generator 100. As will be readily understood, voltmeter 220 is used to monitor this voltage output. Also depicted are interconnecting wires 240, typical 12 volt receptacle clamp 230, and conventional fuse 245.

Figure 9:
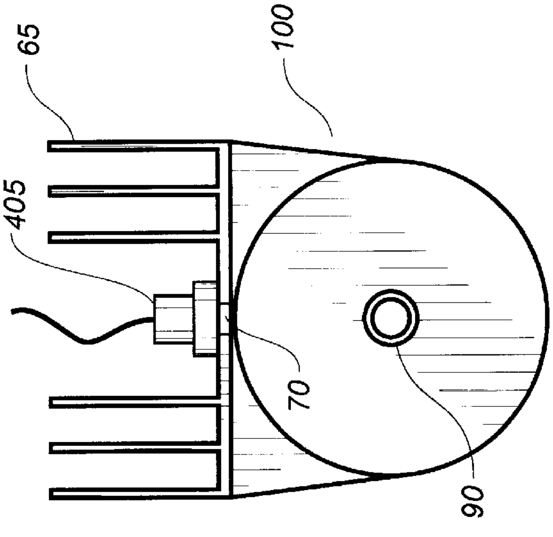
FIG. 9 depicts a simplified cut-away view of a generator and fin assembly embodiment of the present invention depicted in FIG. 1.
Figure 10:
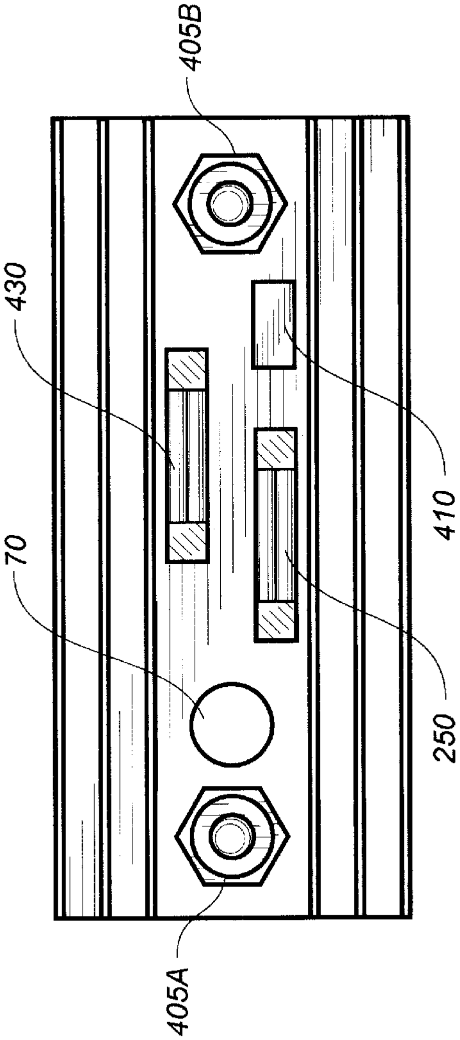
FIG. 10 depicts a simplified top view of a cooling fin assembly embodiment of the present invention.
Figure 11:
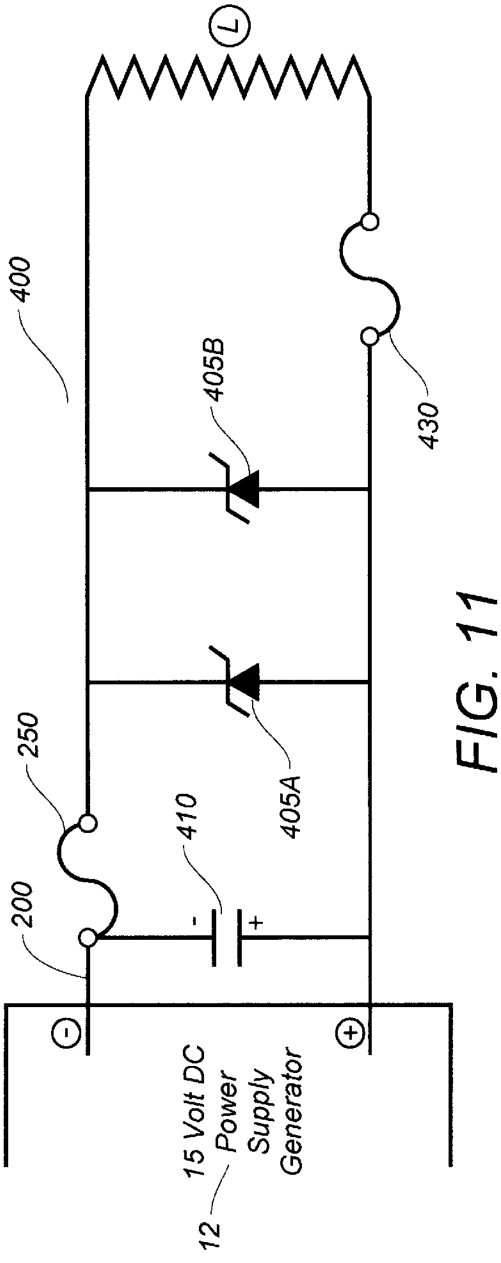
FIG. 11 depicts a diagram of a semiconductor regulator circuit according to the present invention.

Now referring to FIGS. 9–11, the means taught by the present invention for sustaining a constant output DC voltage is depicted. Rather than utilizing a heavy and cumbersome voltage regulator, the present invention provides an electronic circuit for sustaining a constant output voltage. Referring specifically to FIG. 11, there is shown a compact electronic circuit that regulates the voltage output by the generator of the present invention. More particularly, governor circuit 400, similar to rectifier circuits known in the art, preferably comprises plurality of Zener diodes 405A, B to sustain a constant voltage output to an appliance and the like that is interconnected with wires 200 (FIG. 1).

To achieve a constant 12 volt output contemplated by the preferred embodiment, a Zener diode such as model number NTE52555A of NTE Electronics, Inc. of Bloomfiled, N.J. may be used; this Zener diode is rated to hold the voltage to 12 volts, plus or minus 5%. Eight amp fuse 250 protects Zener diodes 405 A, B. When a power source is disconnected from load L, plurality of Zener diodes 405A, B prevent the voltage from increasing above 13 volts. Since the generator is preferably rated at 5½ amps at 13 volts, load L when introduced to governor circuit 400, causes the voltage to be suppressed by loading the generator, to avoid any spiking. Fuse 430, preferably 8 amps, protects the power source from overload. As will be appreciated by those skilled in the art, instead of a fuse, an auto-reset breaker and the like may be used. A preferably 50 volt 1,000 MFD capacitor 410 is incorporated into governor circuit 400 to afford additional protection against spikes in a manner well known in the art.

As will be understood by practitioners in the art, fluctuations in the voltage output from an AC/DC generator can cause damage to the appliance receiving electrical power from the generator. While operating with a load, an AC/DC generator generally outputs a constant voltage. When the load is removed, however, the gasoline engine driving the generator tends to increase its RPMs, thereby causing increased rotational speed of the output shaft, whereby the voltage and amperage are increased. Accordingly, when a load is introduced, the voltage is now higher, thereby causing overload to load L. To prevent such a mishap, the generator's voltage output is preferably limited to 13 volts at 5 amps. Preferably pair of Zener diodes 405A, B are disposed between the positive and negative terminals depicted in FIG. 11 so that, in a manner known to those skilled in the art, when load L is removed from the portable power generation apparatus disclosed herein, the circuit is closed between the terminals, thereby acting as an equivalent load at 50 watts each. The heat generated would be dissipated by heat sink means contained on the present invention to promote cool and hazard-free operation thereof. Thus, this governor circuit taught by the present invention effectuates a constant load passing to the generator which limits the speed engendered by the fuel-operated driver engine.

Referring collectively to FIGS. 9–11, there is seen physical placement of governor circuit 400. Fins 65 of heat exchange assembly 55 are preferably constructed from aluminum and is fixedly attached to the heat conductive portion of generator 125 contained within housing 100. Zener diode 405 is shown disposed centrally of plurality of cooling fins 65. Zener diodes 405A, B and fuses 250, 430 and capacitor 410 are contained within a housing (not shown) for protection. Wires electrically communicating heat exchanger assembly 55 with governor circuit 400 pass through aperture 70 contained centrally within the base of cooling assembly 55. It should be understood that, consistent with the portability and lightweight features of the present invention, the electronic governor circuit could be contained within a power cord and the like.

Figure 5:
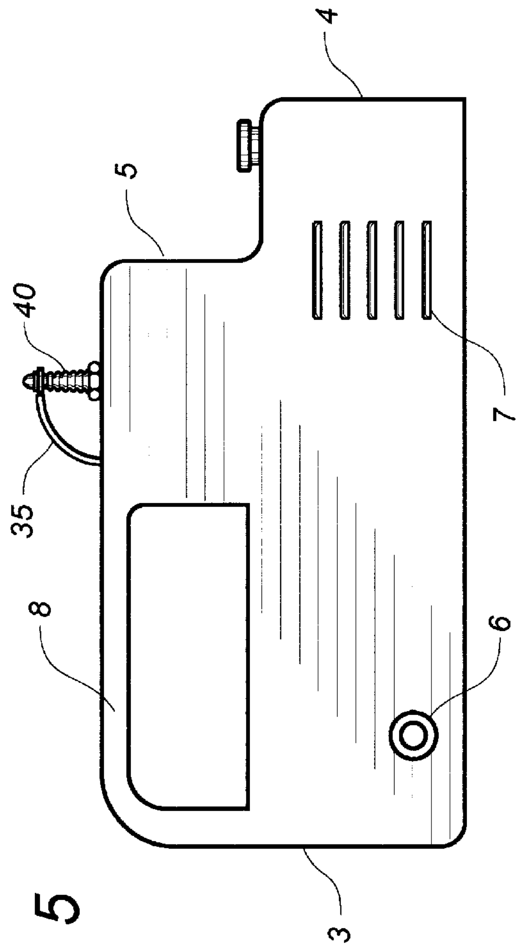
FIG. 5 depicts a frontal view of a cover member embodying the present invention.

Now referring specifically to FIG. 5, there is shown housing 5 which completely covers the portable power generating apparatus disclosed under the present invention. This apparatus, of course, may be conveniently transported using handle 8. As is common in the art, cover 5 should be preferably constructed from a lightweight plastic material that affords sufficient impact resistance and insulates the user from heat and noise. Exhaust hole 6 and cooling vents 7 promote circulation of gases, air and the like. The preferred embodiment of the present invention weighs less than 12 pounds and is constructed with housing 5 preferably having a base measuring 20 inches long, 9 inches high at side 3, and 5 inches at side 4. Thus, it should be appreciated that the preferred embodiment is configured to be about five times smaller than a commonly used household generator.

Figure 8:
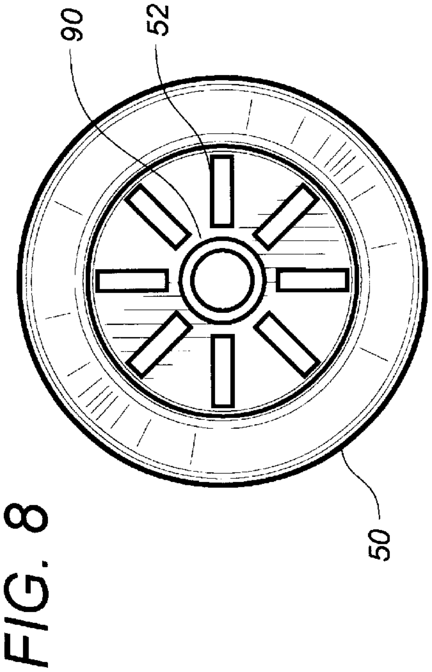
FIG. 8 depicts a simplified right side view of a shroud member embodiment of the present invention depicted in FIG. 1.

Referring specifically to FIGS. 1 and 7–8, there is depicted the cooling means taught by the present invention. Cooling fin means 55 comprising plurality of cooling fins 65, in a manner well known in the art, dissipate heat generated by DC generator 125 and the plurality of loaded Zener diodes. Preferably constructed from aluminum, heat generated by generator 125 and the plurality of loaded Zener diodes is drawn up into plurality of heat exchange fins 65 and is then drawn toward driver engine 25. Ambient air, in turn, cools heat exchange assembly 55. To further promote cool-operation of the present invention, insulation material 210 or metallic heat sink material and the like may be used to help dissipate heat. As described herein, however, heat generation is inherently minimized because of the low RPM operation of the liquid fuel-driven engine.

Referring to FIGS. 7–8, shroud 50 is depicted with plurality of slots 52 which promote the influx of air into the shroud to cool gasoline engine 25. Crankshaft 90 communicates with armature 110 of DC generator 125. When air is drawn into shroud 50 through plurality of slot means 52, it is also drawn across the surfaces of preferably heat conductive aluminum comprising heat exchange fin means 55. Ambient air is exchanged with the hotter air being discharged and displaced from the engine.

As will be appreciated by those skilled in the art, to be effective during outdoor activities such as fishing and the like, it is advantageous to have a portable power source which is quiet. Otherwise, the noise typically produced from portable, albeit cumbersome power sources known in the art tends to interfere with the fish and game being sought, and, of course, tends to undermine the natural solitude of the out-of-doors environment. To provide a quiet source of power in the field and portability, the preferred embodiment of the present invention teaches the use of Weedeater-type driving engine well known in the lawn care art and the use of a miniature DC-generator or motor on the output side akin to a conventional automobile windshield wiper motor.

It will be appreciated that such a Weedeater-like 2-cycle engine which typically provides about 1 hp at idle and 1600 RPM, and which is typically air-cooled and uses a reciprocating piston type combustion chamber with an interconnected crankshaft via a connecting rod, inherently has minimal components, spins faster than larger motors, and inflicts minimal wear on the crankshaft. As will be appreciated by those skilled in the art, the energy generated in the combustion chamber is transferred to the connecting rod and then to the crankshaft, and converted into rotational energy onto the output shaft. In the small 2-cycle engine contemplated by the present invention, the components including the crankcase, piston, and cooling fins, are preferably constructed from aluminum. Thus, the present invention is well-suited for providing power for vehicles, on water craft, and in the field which generally corresponds to a full load of about 5 amps at 12 volts and 1600 RPM, which only draws about 0.1 hp from the uniquely overpowered driving engine.

Since the present invention teaches cool-running, low RPM operation, it affords the feature of efficient fuel-consumption whereby power may be provided to such emergency devices as the electrically powered refrigerator/cooler for up to 3 hours on a mere pint of gasoline. It will be understood that embodiments of the present invention may be constructed using a 4-cycle engine or even a rotary engine, e.g., a Wankel engine. Indeed, embodiments of the present invention may be configured with the hp of the driving engine being sufficiently large relative to the hp capacity of the generator to accommodate particular needs based upon amperage, voltage, and physical size. For example, some fork lifts while requiring 12 volts also require high amperage.

While a typical 2-cycle engine such as a Weedeater engine is designed with an internal muffler means, in order to promote quiet operation, the present invention also comprises a supplemental muffler means. Referring to FIGS. 1–2, exhaust assembly 260 includes supplemental muffling means comprising muffler 260 and silencer 280. To afford maximum safety, the supplemental muffler taught by the present invention should preferably be flame-arrested. As will be understood by those skilled in the art, muffler 260 comprises a suitably sized muffler typical of those used in automobiles and the like. Similarly, silencer 280 comprises a suitably sized resonator that is optionally used in the exhaust systems of automobiles and the like. Thus, in conjunction with running at low RPM, the dual featured muffler system of the present invention inherently generates power with a substantial solitude hereinbefore unknown in the art. The droning sound that typifies conventional external power sources in the field or during emergencies not only disturbs personnel involved, but also disturbs the innate beauty of the natural environment.

As disclosed herein, while the driver engine is running, DC power is generated and may be conveniently delivered to a suitable appliance, used to recharge a battery, etc. In a manner well known in the art, electrical current is induced as coils of wire move in a magnetic field, thereby intersecting the magnetic lines of force. As the rigid shaft of the DC motor is driven by the crankshaft, in the course of a revolution, each half of a conventional commutator is successively in contact with a top and bottom of a carbon brush pair, respectively. The rigid shaft is circumscribed by an armature of a permanent magnet generator/motor, and metal plates are passed through the electromagnetic field. As will be appreciated by those skilled in the art, the armature, comprising the windings, iron core, and commutator, rotates between the poles of the permanent magnet and generates electrical current. It should be evident that using a small DC generator with an armature spinning between two permanent magnets promotes the lightweight aspect of the present invention because components such as conventional, heavy excitors and voltage regulators are rendered unnecessary. These types of conventional components, of course, not only add weight and bulk to an apparatus, but also impart heat.

It will be understood by those skilled in the art that output voltage is controlled by the speed of the small driving engine. As is well known in the art, the RPM of this engine is easily controlled by rotating a carburetor throttle adjustment means and the like. Under the present invention, a small self-contained, self-cooled gasoline engine drives a DC generator in order to generate a constant 12 volt DC and the like. As hereinbefore described, a suitable 12 volt appliance or a 12 volt battery may be electrically interconnected with the present invention to provide portable constant DC power thereto. To obtain specific watts required by appliances, as hereinbefore described, the RPMs of the driver engine may be increased or decreased as appropriate.

Of course, if the power requirements of a particular appliance and the like exceed the common maximum of 5 amps at 12 volts, then it is within the teachings of the present invention to change the size and capacity of the liquid fuel engine and the corresponding AC/DC generator. For example, if an appliance requires 10 amps DC, then it would be necessary to increase the capacity of both the driver engine and the generator to attain suitable power.

Figure 13:
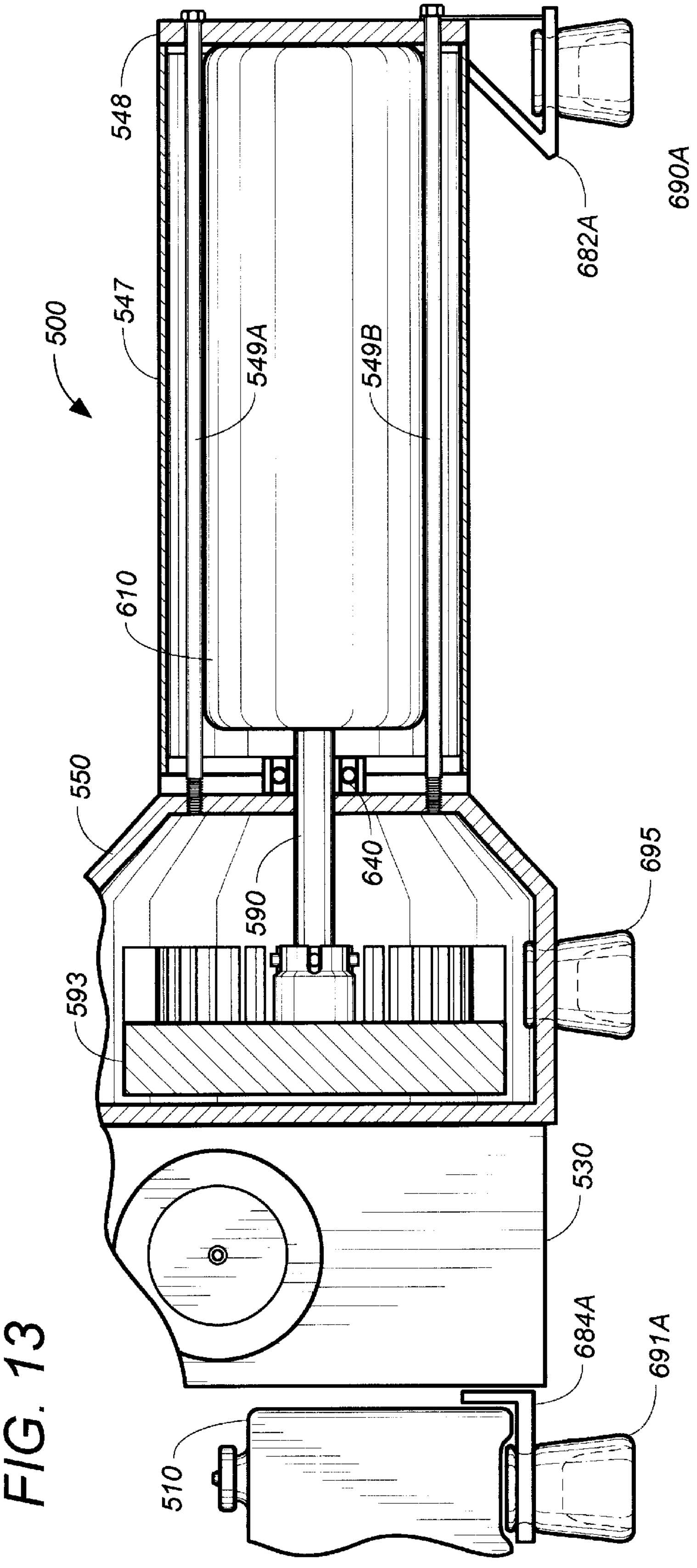
FIG. 13 depicts a frontal partial cut-away view of an alternative embodiment of the present invention.

Referring now to FIGS. 13–20 there is depicted an alternative embodiment of a portable power generator taught by the present invention. FIG. 13 depicts a frontal partial cut-away view of alternative embodiment 500 comprising input shaft bearing assembly 640 with input shaft 590. Shroud 550 covers flywheel 593 disposed on the gasoline engine. Pair of bolts 549 A and B are disposed parallel to the longitudinal axis of cylindrical generator housing 547 and pass through support plates 682A, B, C, D and then are threadedly attached to shroud 550. Also depicted therein are armature 610, fuel tank 510 and engine block 530. Plurality of rubber shock support means 690 A, B disposed beneath generator housing 547 are shown fixedly attached to corresponding shock absorber support brackets 682 A, B. More particularly, there is shown rubber shock support means 690 A fixedly attached to corresponding shock absorber support bracket 682 A; similarly, rubber shock support means 690 B is fixedly attached to corresponding support bracket 682 B. Plurality of rubber shock support means 691 A, B disposed beneath engine block 530 are shown fixedly attached to corresponding engine shock absorber support brackets 684 A, B. More particularly, there is shown rubber shock support means 691 A fixedly attached to corresponding support bracket 684 A; similarly, rubber shock support means 691 B is fixedly attached to corresponding support bracket 684 B.

Figure 14:
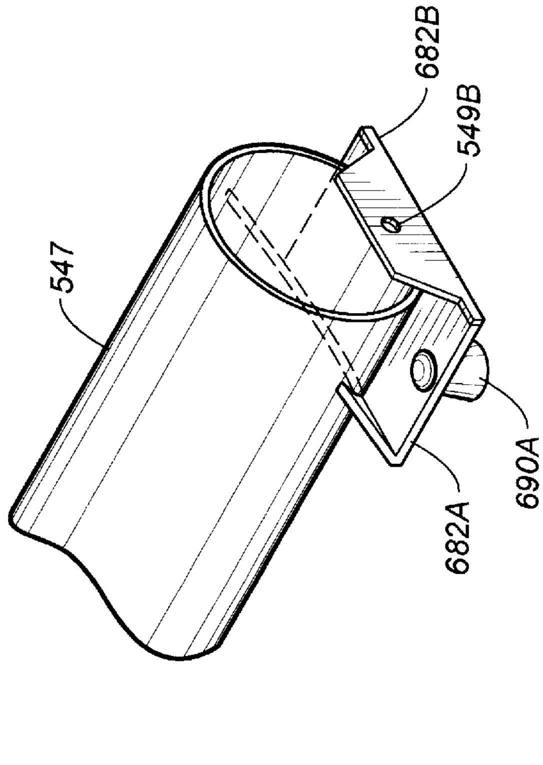
FIG. 14 depicts a right end perspective view of the embodiment of the present invention depicted in FIG. 13.

As will be appreciated by those skilled in the art, plurality of shock support brackets 682 A–B should preferably be molded to the rear portion of bearing support 548. For supplemental support provided in the central portion of shroud 550, plurality of shock supports 695 A and B (not shown) could be used which also promotes proper flywheel clearance. Alternatively, shock support bracket 682 could be bolted onto rear bearing support as shown in FIG. 14, which is a perspective end view of the exposed end portion of generator housing 547. In a manner well known in the art, shock support bracket 682 may be secured to housing 547 using any suitable fastener such as screws and bolts. Similarly, shock support bracket 684A should preferably be fixedly attached to the gasoline engine block using conventional bolts, rivets, or the like. Of course, another common means for attaching shock support bracket 684 to the engine block is simply for the bracket to be molded to the engine block, per se.

Figure 16:
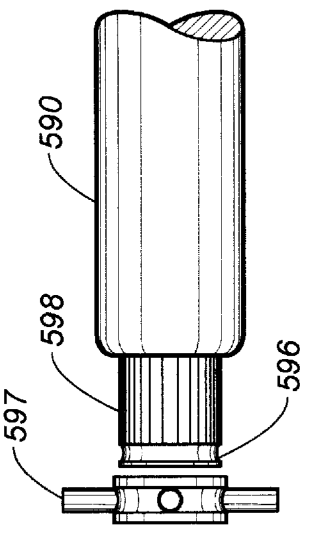
FIG. 16 depicts a right side view of a portion of the embodiment depicted in FIG. 13.
Figure 15:
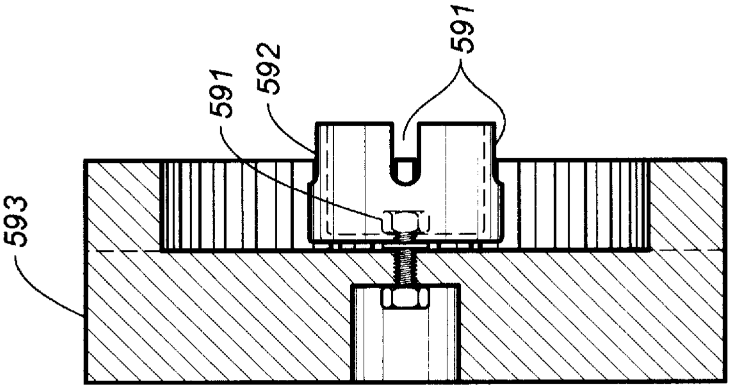
FIG. 15 depicts a right side cut-away view of a portion of the embodiment depicted in FIG. 13.

As will be understood by those skilled in the art, it has been found to be advantageous to include a flex coupling between the generator input and the crankshaft output. A flex coupling embodiment taught by the present invention is illustrated in FIGS. 15 and 16. Flywheel 593 is shown fixedly attached to gasoline engine crankshaft 590. Flex coupling 592 is shown with retainer means 591 fixedly attached to the gasoline engine crankshaft. Flex coupling 591 is depicted with plurality of slots 599 configured for receiving corresponding plurality of spokes or cogs 597. In particular, FIG. 16 depicts a side view of the generator input shaft that is coupled, via plurality of splines 598 to corresponding plurality of drive spokes 597. It will be appreciated that this flex coupling may be retained on input shaft 590 by a snap ring and the like which is configured to be received by groove 596 disposed on shaft 590. Thus, each spoke of plurality of drive spokes 597 is then inserted into each slot of plurality of slots 599, configured to allow flexibility between the engine crankshaft and the input shaft disposed longitudinally within generator housing 547. According to the present invention, incorporation of such a flex joint into a portable power generator allows a workable amount of flexibility in the joinder between the input shaft and the engine crankshaft without adversely affecting the overall efficiency of the power generated. It is within the contemplation of the present invention to provide rubber or plastic coating on each of the plurality of spokes contained on drive spokes 597 to reduce noise and wear.

It will be understood that the present invention may be constructed without a covering or housing. For example, embodiments may be constructed with a handle attached to the base plate as hereinbefore described. Another embodiment might be constructed with the handle attached to the motor and generator. As will be appreciated by those skilled in the art, the present invention is configured to be conveniently transported in a variety of carrying cases or bags. Of course, the generator contemplated by the present invention could also be AC-operated, but AC is not commonly used in outdoor activities, in vehicles and on water craft. As should be evident to those conversant in the art, the present invention would be modified to include a second set of AC windings in the generator.

Figure 17:
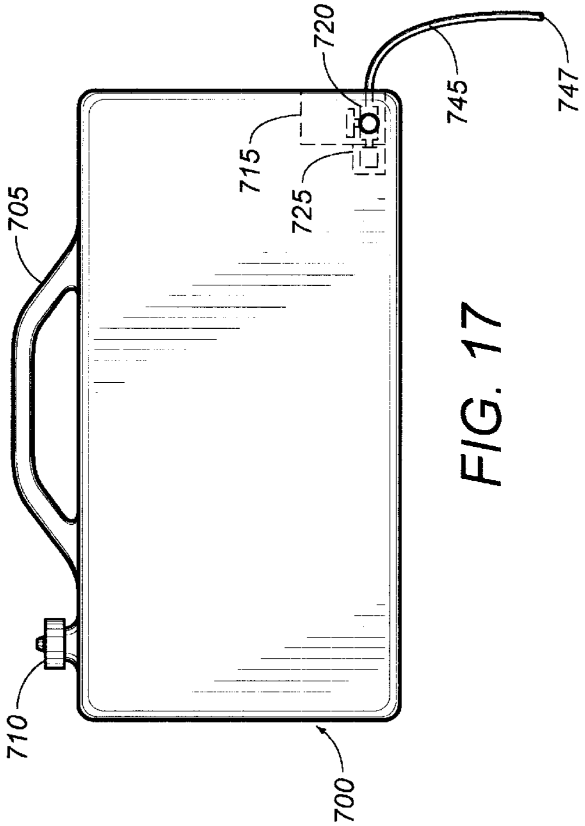
FIG. 17 depicts a front view of an auxiliary fuel tank according to the present invention.

Referring now to FIGS. 17–20, there is seen an auxiliary fuel tank 700 taught by the present invention for periods of prolonged power generation as contemplated hereunder. Auxiliary fuel tank 700 should preferably be constructed from gasoline-resistant plastic materials known in the art. Depicted in FIG. 17 is handle 705 which is fixedly attached to fuel tank 700, preferably molded thereto. As clearly shown, filler cap 710 is configured with a sealable vent plug which is commonly used in the art. Also shown, is shut-off valve 720 which is preferably recessed for protection from physical damage. It should be evident that the connection of valve 720 to valve support 725 is configured to provide sufficient rigidity thereto.

Figure 18:
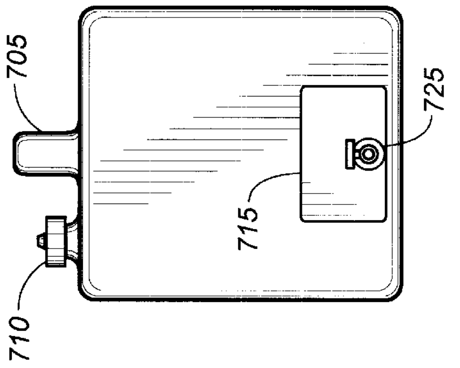
FIG. 18 depicts a right end view of the embodiment depicted in FIG. 17.
Figure 20:
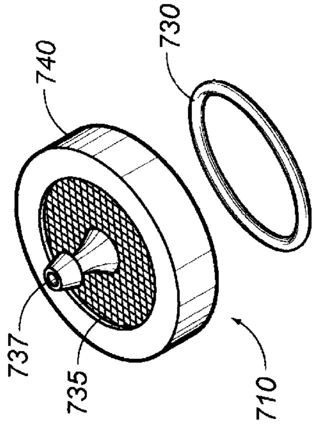
FIG. 20 depicts an exploded view of a cap member of the embodiment depicted in FIGS. 17–19.
Figure 19:
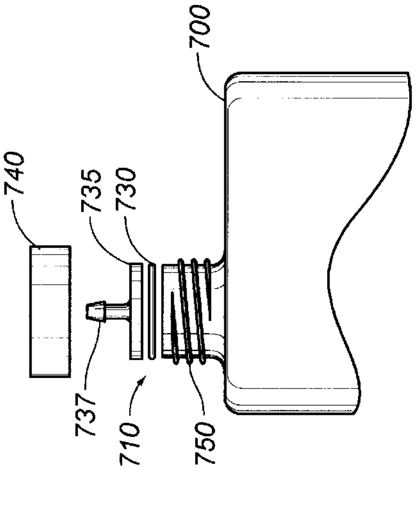
FIG. 19 depicts a front view of an auxiliary fuel tank embodiment of the present invention depicted in FIGS. 17–18.

FIG. 18 depicts a front view that isolates recessed region 715 in auxiliary fuel tank 700 and valve support 725. Referring now specifically to FIGS. 19 and 20, there is shown an exploded view of gas cap 710. Gasket 730 seats spout orifice assembly 735 to generator fuel tank 510. Retainer ring means 740 is preferably screwably received by thread means 750 conventionally disposed upon filler cap means 710 and gasket means 730 firmly to the generator fuel tank. Referring again to FIG. 17, there is seen fuel line 745 connected to shut-off valve 720 at one end and to spout 737 disposed at the other opposite end thereof. Since the generator taught by the present invention is configured with a built-in pump, when valve 720 is open, gasoline is drawn from auxiliary tank 700 to generator tank 510. As will be understood by those skilled in the art, this flow of gasoline from the auxiliary fuel tank into the generator fuel tank enables the portable power generator contemplated by the present invention to operate continuously for several days, without having to be stopped for refueling purposes.

Thus, it will be understood that the present invention enables constant DC voltage to be provided to common 12 volt appliances and the like, in the field and stream and other outdoor environments. This is achieved using the hereinbefore described apparatus taught by the present invention wherein a special matching of the implicated gasoline engine—that drives the power generation—and the AC/DC generator is performed. This matching aspect of the present invention essentially coordinates selection of gasoline engine RPMs and HP rating and corresponding electric generator HP rating.

Embodiments of the present invention enable energy to power DC appliances with an efficiency and portability heretofore unknown in the art. Depending upon the power demanded by such appliances for normal operation, the voltage is typically 12 volts but with varying amperage. The matching function contemplated by the present invention establishes a direct relationship between the RPM of the powering engine and the power-prerequisite of the electrical appliance that receives power from the generator coupled to the engine. As herein described, a gasoline engine rated as 1,000–1,500 RPM has been found to provide excellent performance for the diversity of appliances applicable in the field and stream, or other outdoor environments. It will be readily appreciated that the direct connection between powering engine and DC generator has heretofore been unknown in the art. Instead of using a cascade of resistors or the like, the present invention teaches a novel control circuit including a plurality of Zener Diodes. For power generators known by those skilled in the art, the powering engine has typically significantly more capacity than the electrically coupled (AC) generator. Heat is typically attenuated using well known water-cooling or air-cooling techniques.

The preferred embodiment of the portable power generator of the present invention would be configured with a 1 HP gasoline engine or the like idling at 1,000–1,500 RPM, relative to a conventional air-fuel mixture, and would be idling or "free-wheeling" when there is no appliance attached to the output thereof. Obviously, this free-wheeling phenomenon is attributable to there being no resistance or draw upon the engine. When, on the other hand, an appliance is electrically connected to a port to utilize the output generated, resistance is introduced in an opposite direction to the rotation effectuated by the engine. It should be apparent that the extent of this resistance determines resultant RPM. For instance, for this 1 HP engine, introducing an appliance that draws ¼ HP, slows down the motor by 25% so that electricity is generated at 750 RPM to develop ¼ HP. That is, if an appliance having a ¼ HP electric motor were interconnected with an embodiment of the present invention, prerequisite power would be generated at 750 RPM.

It will be appreciated that incorporating a plurality of Zener diodes into the circuitry of the present invention assures that a constant voltage will be generated so that proper operation of interconnected appliances may be sustained. When an electrical appliance (that draws ¼ HP) is disconnected from the output port of the present invention, 25% of the power generated is released and the gasoline engine tends to increase its speed; under embodiments of the present invention, this released power is directed toward the Zener Diodes. The Zener Diode circuit remains open until a certain fixed voltage level is reached. That is, when an electrical appliance is connected to the portable power generator's output port, this load causes the gasoline engine's RPM to decrease nominally from 1000 to 750.

On the other hand, when this appliance is disconnected, the generator's armature is no longer carrying any load and allows the gasoline engine to increase RPM toward the original 1,000 RPM. It will, of course, be understood that simultaneously with this return to a value of 1,000 RPM the voltage increases. But, designed to avoid voltage fluctuation, the Zener Diodes of the present invention are triggered as soon as the preset 12 volt value is exceeded, thereby closes the control circuit so that, since the resistance is contained within the Zener diodes, this loads the generator. It will be appreciated that the present invention tends to sustain the gasoline engine at 750–755 RPM and the voltage at 12 volts ±0.1 volt. Accordingly, the output voltage and the gasoline engine RPM are simultaneously kept constant.

Unlike generators known in the art that sustain constant voltages electronically, the present invention teaches an apparatus and methodology for sustaining constant voltage by a synergistic combination of electronic and mechanical components. As herein elucidated, by setting the Zener Diode circuit at a particular voltage level, e.g., 12 volts at ¼ HP, the gasoline engine RPM is, in effect, factored out of the power generation equation: as the voltage rises under no load conditions and exceeds this preset value of 12 volts, the Zener diodes are activated wherein the circuit is closed. This, of course, has the effect of absorbing the ¼ HP and converts it into heat by transmission of resistance, akin to a heating element.

It will be understood by those skilled in the art that the matching taught by the present invention provides power generation efficiency heretofore unknown in the art. As an example, for an engine idling at 1 HP and 1,000 RPM, in the absence of suitable throttle control, can cause the engine to develop 2 HP at approximately 1,750 RPM; now, instead having an output of 12 volts, the output may be as high as 24 volts. Thus, it has been found that matching between the rating of the powering engine and the generator is crucial to successful operation of a portable power generator contemplated by the present invention. If the Zener Diode resistance has been increased to the equivalent of 2 HP, then ½ HP is developed, and the energy is drained from the generator, thereby resulting in an even greater load. Accordingly, if a mismatch between the gasoline engine and the generator occurs, then the consumption of energy that is transferred to the appliance being powered is significantly diminished.

As another example, using a 5 HP gasoline engine, instead of a 1 HP engine, in conjunction with the same ¼ HP electric generator at 12 volts, still only enables ¼ HP power to be drawn from the combination. Even though the driver motor is rated at five times the HP, the voltage may increase to more than 15 volts at 950 RPM. 50 RPM have in effect been lost because of this mismatch and consequent overpowering of the DC generator. It should be clear that, under the present invention, to accommodate a 5 HP instead of a 1 HP gasoline engine, the matched generator would preferably likewise be increased five times, and the circuitry of the present inventon would preferably comprise five Zener Diodes.

Figure 12:
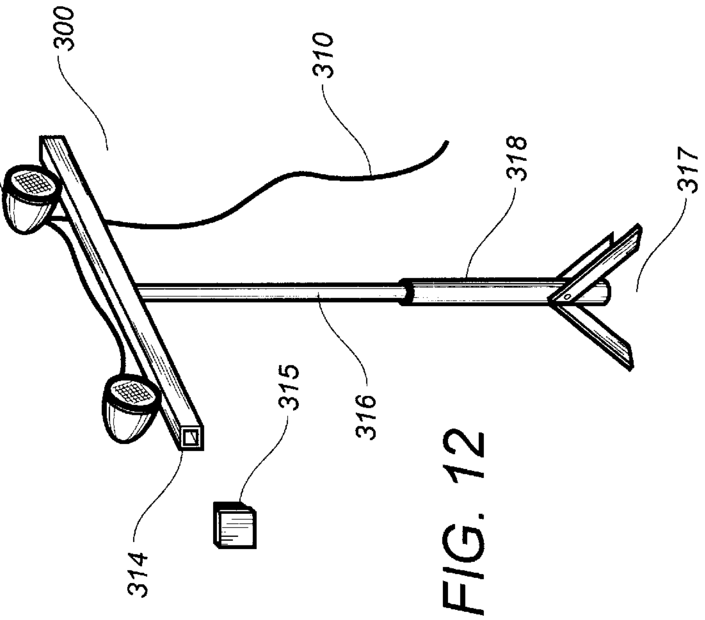
FIG. 12 depicts a frontal perspective view of a light-stand assembly according to the present invention.

Now referring to FIG. 12, there is depicted light assembly 300 illustrative of another aspect of the present invention: a self-contained portable illumination source designed to be integrated with the portable power generator herein described. This portable light assembly preferably weighs less than 12 pounds and is assembled from components stored within its hollow casing 314. Pair of conventional 12 volt automobile sealed beam lamps 313 are shown rotatably attached upon the outer circumferential surface of preferably hollow tubing 314 having a pair of easily insertable end caps 315. End caps 315 are configured to be releasably received in each end of tubing 314.

It has been found that a screwable relationship is generally advantageous between end caps 315 and tubing 314. Hollow tubing 314 is configured to contain preferably all telescopic poles and legs prerequisite for assembling a portable source of illumination in the field as contemplated under the present invention. To assure compactness of the present invention, plurality of legs 317 are configured to be inserted into plurality of poles so that efficient storage within hollow cylindrical casing 314 is achieved. Plurality of legs 317 may be releasably inserted into lower portion 318 of pole 316, in any of ways well known in the art, for sustaining light assembly 300 in an erect position. In the preferred embodiment, one of the pair of end caps 315 is configured with a means to receive plurality of legs 317 thereon, and even to receive a pole in the center thereof, so that such pole may be inserted into the ground as a means of support for the lighting assembly. Of course, light assembly 300 may be caused to be disposed in an erect position by inserting pole 316 between rocks, into sand or dirt, etc.

While the preferred embodiment of assembly 300 may be fully extended to as high as 7 feet by inserting and fully extending multiple poles (not shown) into upper pole 316 within lower pole 318, it has been found to be advantageous to secure tube 314 using guide wires and the like for stability and safety purposes. As should be evident to those skilled in the art, the housing, pole and leg members should preferably be constructed from a lightweight, corrosion-resistant material such as aluminum or a suitable plastic or fiberglass, etc. Under the teachings of the present invention, electrical cord 310 is electrically interconnected with DC receptacle 230 (FIG. 6) to supply power to light assembly 300 in the field.

Similarly, the present invention may be used to enable the remote common sportman's equipment which require a 12-volt power source. The present invention may also be conveniently used to charge a conventional automobile battery and the like.

Other variations and modifications will, of course, become apparent from a consideration of the structures and techniques hereinbefore described and depicted. Accordingly, it should be clearly understood that the present invention is not intended to be limited by the particular features and structures hereinbefore described and depicted in the accompanying drawings, but that the present invention is to be measured by the scope of the appended claims herein.

What is claimed is:

1. A portable apparatus for delivering constant DC power in vehicles, on boats, and in the field, comprising:

a base plate having a first plurality of cushioning means having elastomeric mounting means for placement upon a substantially flat horizontal surface;

a permanent magnet DC generator, having armature means and commutation means, disposed upon said base plate at one end thereof;

a fluid-powered internal combustion engine disposed at the other opposite end of said base plate and interconnected with said permanent magnet DC generator via a crankshaft disposed parallel to said base plate, so that DC power is generated by said permanent magnet generator when said fluid-powered internal combustion engine is running;

flexible coupling means for coupling said permanent magnet generator with said crankshaft means;

said fluid-powered internal combustion engine having:

a fuel tank means with a first tank for providing fuel for running said internal combustion engine, a carburetor for mixing said fuel with ambient air, a starter for starting operation of said internal combustion engine, a combustion chamber for combusting said mixed fuel, an exhaust means for venting gases into the ambient, a muffler for minimizing noise generated during operation thereof, and a second plurality of cushioning means having elastomeric mounting means for placement upon said substantially flat surface;

semiconductor circuit governor means having a plurality of Zener diodes and capacitor means electrically interconnected with said DC generator for limiting the RPM output of said internal combustion engine to control, in turn, the voltage output from said permanent magnet generator;

a heat exchanger fixedly attached to said permanent magnet generator and having a fin assembly with a plurality of fins for dissipating heat created incident to said internal combustion engine running and generating power from said permanent magnet generator; and port means for electrically connecting external appliance means for using said generated DC power.

2. The portable apparatus recited in claim 1 wherein said base plate includes a housing configured to enclose said permanent DC generator means coupled with said crankshaft means.

3. The portable apparatus recited in claim 1 wherein said heat exchanger includes heat sink means.

4. The portable apparatus recited in claim 1 wherein said fuel tank means includes a second, auxiliary tank in fluid communication with said first tank for providing supplemental fuel for running said internal combustion engine.

5. A portable apparatus for delivering constant DC power in vehicles, on boats, and in the field, comprising:

a base plate having a first plurality of cushioning means having elastomeric mounting means for placement upon a substantially flat horizontal surface;

a permanent magnet DC generator, having armature means and commutation means, disposed upon said base plate at one end thereof;

a fluid-powered internal combustion engine disposed at the other opposite end of said base plate and interconnected with said permanent magnet DC generator via a crankshaft disposed parallel to said base plate, so that DC power is generated by said permanent magnet generator when said fluid-powered internal combustion engine is running;

flexible coupling means for coupling said permanent magnet generator with said crankshaft means;

said fluid-powered internal combustion engine having:

a fuel tank means with a first tank for providing fuel for running said internal combustion engine, a carburetor for mixing said fuel with ambient air, a starter for starting operation of said internal combustion engine, a combustion chamber for combusting said mixed fuel, an exhaust means for venting gases into the ambient, a muffler for minimizing noise generated during operation thereof, and a second plurality of cushioning means having elastomeric mounting means for placement upon said substantially flat surface;

semiconductor circuit governor means having a plurality of Zener diodes and capacitor means electrically interconnected with said DC generator for limiting the RPM output of said internal combustion engine to control, in turn, the voltage output from said permanent magnet generator;

a heat exchanger fixedly attached to said permanent magnet generator and having a fin assembly with a plurality of fins and heat sink means for dissipating heat created incident to said internal combustion engine running and generating power from said permanent magnet generator; and port means for electrically connecting external appliance means for using said generated DC power.

6. The portable apparatus recited in claim 5 wherein said base plate includes a housing configured to enclose said permanent DC generator means coupled with said crankshaft means.

7. The portable apparatus recited in claim 5 wherein said fuel tank means includes a second, auxiliary tank in fluid communication with said first tank for providing supplemental fuel for running said internal combustion engine.

* * * * *